Dec. 23, 1958    R. JONKE ET AL    2,865,821
PROCESS FOR THE MANUFACTURE BY THE ELECTROFORMING METHOD
OF PARTS AND COMPONENTS SUBJECTED TO STATIC AND
THERMAL STRESSES, AND PARTICULARLY OF MOULDS
Filed Sept. 29, 1953    3 Sheets-Sheet 1

Dec. 23, 1958 R. JONKE ET AL 2,865,821
PROCESS FOR THE MANUFACTURE BY THE ELECTROFORMING METHOD
OF PARTS AND COMPONENTS SUBJECTED TO STATIC AND
THERMAL STRESSES, AND PARTICULARLY OF MOULDS
Filed Sept. 29, 1953 3 Sheets-Sheet 2

Dec. 23, 1958  R. JONKE ET AL  2,865,821
PROCESS FOR THE MANUFACTURE BY THE ELECTROFORMING METHOD
OF PARTS AND COMPONENTS SUBJECTED TO STATIC AND
THERMAL STRESSES, AND PARTICULARLY OF MOULDS
Filed Sept. 29, 1953  3 Sheets-Sheet 3

United States Patent Office 2,865,821
Patented Dec. 23, 1958

2,865,821

PROCESS FOR THE MANUFACTURE BY THE ELECTROFORMING METHOD OF PARTS AND COMPONENTS SUBJECTED TO STATIC AND THERMAL STRESSES, AND PARTICULARLY OF MOULDS

Richard Jonke, Vaucresson, and Josef Lintner, La Garenne-Colombes, France

Application September 29, 1953, Serial No. 383,048

Claims priority, application France October 7, 1952

5 Claims. (Cl. 204—6)

There is no manufacturing process enabling a metal surface to be produced from a given pattern more precisely and more economically than does the electroforming method. But in view of the fact that the thickness of the workpieces obtained by an electrolytic deposit, which we shall hereinafter call "electroform" is usually small in relation to the area of such pieces, this process can only be used when no or only slight static stresses are to be feared. It is true that the rigidity of electroforms can be increased by casting into them a metal with a melting point lower than that of the electroform, but if this is done full advantage is not taken of the resistant properties of the electrolytic metal, because the dimensions of the part to be made must always be calculated according to the casting metal which is the least resistant. In addition, a mould of this type cannot withstand temperature variations, because, owing to the difference in the respective expansion factors of the two metals, internal strains arise which may cause the mould to break.

The purpose of the manufacture, according to this invention, of parts able to bear static and/or thermal stresses is to take full advantage of the resistant properties of the electrolytic metal deposits and to obtain parts which are not affected by temperature variations.

The process covered by the invention can also be used for strengthening of articles which have themselves been produced by a different process. It is obvious that when the strengthening components are made of a metal other than that of the article to be strengthened, the finished product will not bear either static or thermal stresses without risk.

The process covered by the invention is more particularly characterized by the fact that after a part with a comparatively thin wall has been formed, for instance as electroform obtained by electrolytic deposit, the said part or electroform is provided with strengthening components by means of the electroforming method. These strengthening components take the greater part of the stresses applied or, alternatively, transmit them in turn to a strengthening wall.

This system of strengthening components can be achieved by placing on the electroform a suitable supporting base, for instance a base consisting of honeycomb cell, which constitutes the core of the subsequent system of strengthening elements, this supporting base being coated afterwards with an electrolytic deposit of the desired thickness.

Thus, not only is the system of reinforcing elements formed and the thickness of the electroform is increased, but generally speaking the said system of reinforcing elements simultaneously unites with perfect homogeneity with the said electroform.

The elements of the reinforcing system are therefore formed in the same manner as the electroform itself, by galvanoplastic. The whole thus has the same crystalline structure throughout all its parts. The good resistant properties of the electrolytically deposited metal are retained in their entirety and temperature fluctuations do not cause any internal strain.

If the edges of the reinforcing system furthest from the electroform are joined by sheets, by a plate or by electroforming in such a manner as to form an enclosed cavity subdivided by the said reinforcing elements, this cavity can serve as a housing for a cooling or heating means.

If necessary, this electroformed reinforcement can be extended by forming, with the same process, other reinforcing elements which are superimposed on the preceding ones.

However, there are cases in which it is not possible to obtain an electrolytic deposit of a given thickness, for example, when forming long nails of small diameter. In such cases it is more advantageous to make such elements, which it is impossible or at least difficult to obtain by electroforming, by machining them separately out of the same metal as that of the electroform and to insert them in the negative mould so that during the subsequent formation of the electroform these elements unite with it or become firmly anchored in it.

The use of the manufacturing process covered by the invention necessitates the adoption of a method of work which is different from that involved in the processes hitherto known.

This is because, owing to the small size of the metal mass of a mould shaped and reinforced by the electroforming method, combined with the large surface which remains in contact with the heating or cooling agent, the mould takes on the temperature of the heating or cooling agent very quickly. It is therefore possible to regulate as desired the evolution of the temperature during the working phase. The mould can thus be kept at the melting temperature of the injected mass during filling, and solidification by cooling the mould may be commenced only when the mould is entirely filled. This characteristic is essential when moulding very large pieces.

As the injected material does not undergo any cooling while the mould is being filled, it can, in theory, be introduced without the application of pressure. Even in practice an injection pressure of 5–10 kg./cm.$^2$ will not be exceeded, that is to say that an article can be moulded in a press of lower power than that of the presses required for the ordinary processes.

If, for instance, steam heating is used, the temperature depends on the steam pressure which, for injected plastic materials, for example, can rise to approximately 30 kg./cm.$^2$, corresponding to 230° C. It follows that the space allowed for the passage of the heating or cooling agent must be designed for such a pressure. In order to save steam and cooling water, every effort will be made to dimension this space as small as possible.

In order to be able to bring about changes in the temperature of the injected mass as quickly and as regularly as possible, a system of channels must be provided. The cells formed by the reinforcing elements and communicating with each other are therefore arranged to the best advantage in rows, each having respectively its own intake and outlet channels for the heating and cooling agent.

To bring about this condition with a minimum consumption of steam and cooling water, the reinforcing system can be arranged on the shells of the mould in such a manner that the highest points are no longer substantially on a plane parallel to the separation surface of the two half-moulds, as is necessary in the case of moulds in which the cavity is closed by a plate, but that the ridges, on the contrary, are of substantially constant height over practically the whole surface of the galvano carrying them. The electrolytic deposit is then effected until the desired thickness is obtained.

So as to make the wall of the thermic exchange chamber capable of withstanding the pressure, the following method can be used: the cells, communicating with each other by means of channels arranged according to the desired circuit of the thermic exchange agent, are filled with a metal having a low melting point (or with wax or some solid metallized material which becomes liquid at low temperature) in such a way that the ridges of the reinforcing support and those parts of the shell of the mould situated substantially at the same level are a few millimetres higher than the level of the metal. The whole is then plunged into the bath again until the thickness of the wall is sufficient for it to support the steam pressure, the said wall welding simultaneously to the parts of the reinforcing ridges and the shell of the mould which are higher than the level of metal with a low melting point. It is only on the surface thus formed that the system of reinforcing elements is applied as already explained, no covering being necessary in this case as the thermic exchange agents then pass in the thin walls of the mould and the galvanoplastic mould is fixed directly on the jaws of the press.

After the mould has been completed the metal with low melting point or the wax, etc. flows out in a melted condition through the passage openings provided for the heating or cooling agent.

According to an alternative method of forming the reinforcing ridges, the negatives of the said ridges are hollowed out directly in a pattern or cast, for example, made of plaster, of the rear wall of the part or electroform to be reinforced, and the ridges are made by electrolytic deposit on the strengthening support constituted by metal with a low melting point cast in the said cavities forming the negatives, after the plaster cast has been removed. It is of advantage to use an alloy which welds easily to the part or electroform as the casting metal with low melting point, so that the strengthening support shall be thoroughly united with the electroform or part and cannot become detached during the handling before the whole is put into the bath.

The manufacturing process covered by the invention can be used, in particular, for making moulds for pressure or injection casting of plastic materials, glass, etc., moulds for the injection of metals, dies for stamping presses, moulds for centrifugal casting, as well as for the manufacture, by electroforming, of structural components or manufacturers products subjected to static or thermal stresses.

Some examples of the application of the manufacturing process covered by the invention are described hereunder and shown on the accompanying drawing, without this description and this drawing being in any way restrictive.

Figure 1:
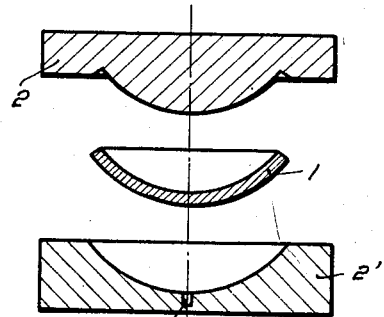
Fig. 1 shows an axial cross-section of a shallow bowl pattern and its two plaster casts.
Figure 2:
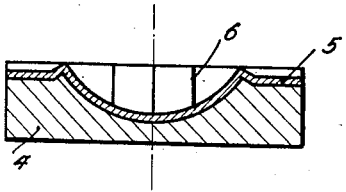
Fig. 2 shows an axial cross-section of one of the negatives obtained from one of the patterns shown in Fig. 1, coated with a metal electrolytic deposit and covered by a strengthening support in accordance with the process covered by the invention.
Figure 3:
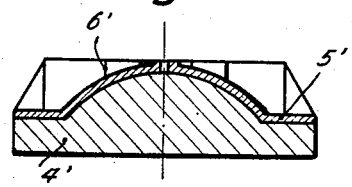
Fig. 3 is an axial cross-section similar to Fig. 2 and corresponding to the other part of the mould.
Figure 4:
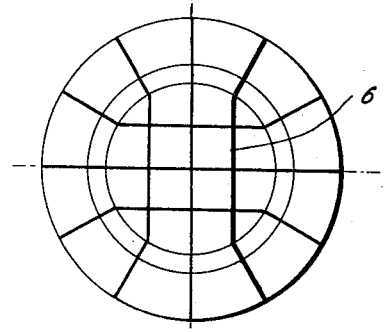
Fig. 4 is a plane view of the half-mould shown in Fig. 2.
Figure 5:
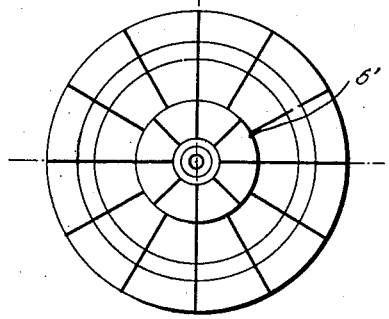
Fig. 5 is a plane view of the half-mould shown in Fig. 3.

In the example shown in Figs. 1 to 6, an original of the bowl 1 to be manufactured is available. Two plaster casts, 2 and 2', are made from it, the said casts being such that the separating surfaces between the two half-moulds are in the plane of the largest cross-section. For the injection channel one of the two half-moulds is pierced with a suitable hole 3. From the plaster casts 2 and 2' negatives, 4, 4', are made, of guttapercha for instance, and these are covered by electroplating with a layer of metal, 5, 5'.

For an injection pressure of 50 kg./cm.$^2$ the mould is made of copper. With a permissible rate of 240 kg./cm.$^2$ for working the material and ridges spaced 3 cm. apart, the necessary thickness of the mould shell is 6 mm.

On the electroformed mould the support 6, 6' provided for the reinforcing system is arranged. This support is constituted by a honey-comb unit and its shape is adapted to that of the corresponding mould shell. For this strengthening, all materials which conduct electricity or which can be made to conduct it can be used but which, however, owing to their similarity to (or identity with) the electrolysis metal, to their compressibility or the possibility of removing them subsequently (metal having a low melting point, wax, for instance), do not give rise to any strains of a thermal character.

The different elements of the reinforcing system are then connected together and to the electroform, so as to form a conducting assembly. This can be done by welding, brazing, by using a conducting varnish coating, for instance.

Once the reinforcement 6, 6' has been put into place and electrically connected to the shell 5, 5' of the mould, the whole is again subjected to the action of the bath.

Figure 7:
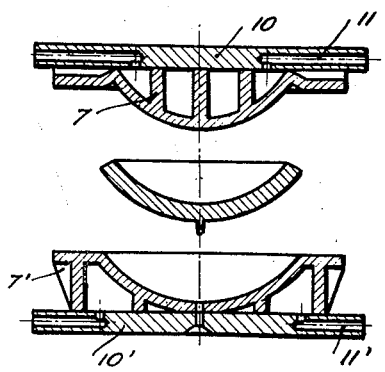
Fig. 7 is an axial cross-section of the unit formed by the two finished half-moulds and of the bowl which they permit of making.
Figure 6:
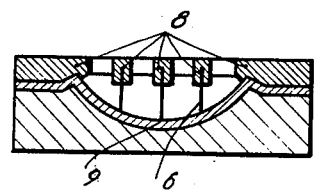
Fig. 6 is an axial cross-section of the half-mould shown in Fig. 2, covered with masks provided for a subsequent electrolytic deposit.
Figure 8:
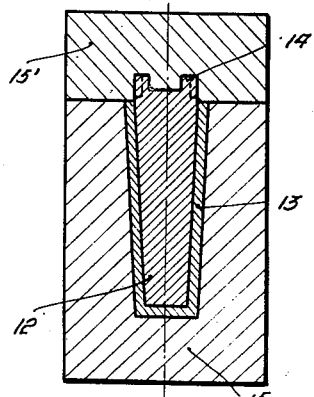
Fig. 8 is an axial cross-section of a pattern for a symmetrical goblet made of zinc with a core of machined metal and of its two plaster casts.
Figure 11:
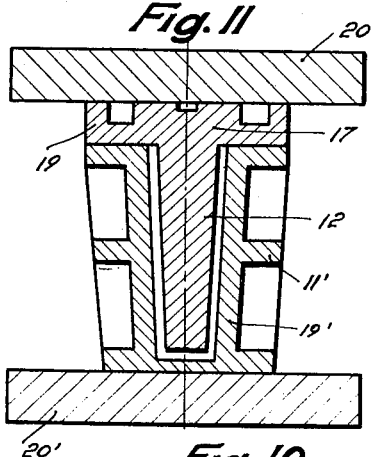
Fig. 11 is an axial cross-section of the mould unit for moulding the goblet shown in Fig. 8.
Figure 9:
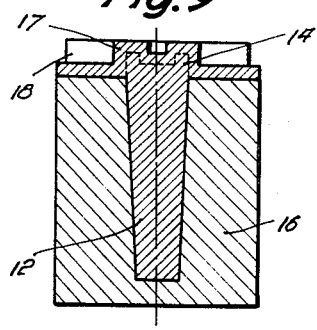
Fig. 9 is an axial cross-section of the core and of one of the negatives obtained from the casts shown in Fig. 8; coated with a metal electrolytic deposit and a strengthening support.
Figure 10:
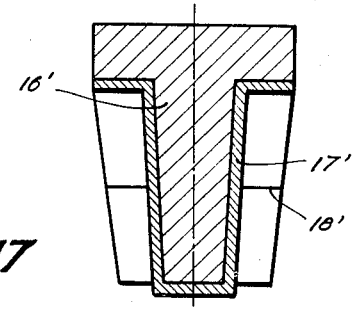
Fig. 10 is a similar axial cross-section of the other negative obtained from the casts shown in Fig. 8.

A deposit, 7, 7' is formed by electrolytic action. In general, its maximum thickness is at the places nearest to the anode (in the example described above, at the upper edges of the strengthening supports 6, 6'), while the deposit on the mould shell 5, 5' is thinner in inverse ratio to the height of the ridges. The non-uniformity of this distribution of the deposit can be avoided by using a simple system of masks, by applying a guttapercha piece 8 (Fig. 6) of a suitable shape and in a plastic state, onto the ridges 6 and those parts of the mould shell which are situated substantially on the same level. With this arrangement the mould can be left in the bath until the desired depth of deposit is obtained in the concave parts, for instance at the places 9 where the shell of the mould and the reinforcement joint. After removal of the system of masks, the mould is again placed in the bath until the ridges 7, 7' (Fig. 7) have reached the desired thickness.

Thanks to this second electroplating process, not only are the strengthening elements formed but, in addition, the mould shell is reinforced. If the thickness of the mould shell is increased by 50% the effective rate of working the material becomes only about 100 kg./cm.² Thus the safety factor, in relation to the yield point of electrolytic copper at 300° C., is approximately 5.

The reverse side of the mould has become irregular in consequence of the galvanoplastic treatment. In order to be able to fix it on a covering plate 10, 10', it must be smoothed by reaming.

Before being mounted the reinforcing ridges are reamed in the centre so that, after the plate 10, 10' is in place, the cooling water can pass from one alveolar cavity to the next.

The covering plate 10, 10' extends beyond the mould everywhere and delimits the cooling chamber; it serves as a housing for the intake and outlet channels 11, 11' for the cooling water and for the parallel guide pins 41 of the two half-moulds, which are fixed onto liner plates 42, 42', plates which are themselves fixed onto the covering plates 10, 10' and finally it permits of fixing the mould on the jaws of the stamping press.

In the example shown in Figs. 8 to 11 the process covered by the invention is used for the manufacture of a zinc goblet mould 4 cm. high and 1 cm. in average diameter, with an injection pressure of 120 kg./cm.²

The core 12 of one of the half-moulds, which forms the cavity of the goblet 13, cannot be made by electroforming. It is therefore machined and provided with an extension or tail 14, projecting above the upper edge of the goblet and which is provided with an anchoring device (such, for instance, as a screw thread with longitudinal groove). This machined part is driven into the goblet pattern 13 and two plaster casts 15, 15', are made from the said pattern and serve, in turn, for making the negatives 16, 16' the machined part being held in one of the negatives 16.

The subsequent formation of the two parts of the mould is effected, in principle, as in the previous example, except that the core 12 is considered as a part of the negative 16 and that iron is used instead of copper.

By a first electroplating operation an electrolytic deposit 17 is formed on the core 12 and the negative 16. This deposit combines thoroughly with the mass of the core 12 and the projecting part 14. On the negative 16' a deposit 17' is formed. A reinforcement 18, 18' is arranged on the electroforms 17 and 17' respectively. A second electroplating treatment ensures the formation of the system of reinforcing elements 19, 19', at the same time as the reinforcement of the moulds 12, 17 and 17'. The covering plates 20, 20' are then fixed by bolts on the two half-moulds.

In the example shown in Figs. 12 to 16 the process is applied to the manufacture of a mould for an automobile roof made of plastic material, having an area of 2 m.² and a thickness of 1.5 mm. for injection moulding.

The starting point is a pattern 21, of sheet metal for example, of the automobile roof. It would be possible, for the manufacture of the mould shells, to proceed in a similar manner to that described in connection with the two examples already given. But the handling of such large moulds and negatives is complicated, and it is therefore preferable to use the sheet metal pattern itself as a negative, this pattern being prepared in such a way that the electrolytic deposit can be easily detached.

The sheet metal pattern 21 is laid on a base 22 with a supporting flange which represents the negative of the contact surface of the two half-moulds. This flanged support 22 can be made of metal, wax, plaster or any other material which is easy to mould, and it is metallized if necessary, while the reverse side of the metal sheet pattern 21 is electrically insulated. The whole is thereupon treated in an acid copper bath until a mould shell, 23, of the desired thickness, is obtained. After removal of the flanged support 22, metal is electrolytically deposited on the front part, 24, of the sheet metal pattern, while the rear part is given a coat of paint or of varnish, for instance, or still further reinforced.

When the electroplating treatment is finished, the two mould shells, which may have become welded together by their edges 25, must be separated, or they can be left joined so as to increase rigidity and, as in the previous examples, the reinforcing ridges 26, 26' can be constructed on both sides. This last method appears to be preferable in the case of large moulds such as the roof shown in this example. The height of the various ridges 26, 26' of the reinforcing supports is substantially constant, 10 mm. for instance, in order to distribute the flow of thermic exchange agents evenly on the surface of the mould and to impart to said flow a speed substantially constant.

An electrolytic deposit in a manner disclosed in French Patent 860,940 is then effected until an electroform and reinforcing ridges 26, 26' are obtained of the desired thickness. A formula for an acid copper bath is described in "Principles of Electroplating and Electroforming" by Bloom and Hogaboom, McGraw-Hill Book Co., 1949, p. 290. Cells 28, 28' are thus formed between the various ridges. Communicating channels 29, 29' are then pierced into the walls of said cells 28, 28' which walls are formed by the ridges 27, 27' and are pierced by a boring tool introduced at the free upper opening between said ridges. Said cells 28 and 28' and channels, are filled with a metal having a low melting point, "Wood" metal for example, or with metallized wax, in such a manner that the level of the said metal or wax is slightly lower than the tops of the ridges 26, 26'.

The mould as a whole is then plunged into the bath again until the thickness of the wall 30, 30' is sufficient to withstand the steam pressure, this wall 30, 30' covering and confining the metal or wax, having a low melting point into the cells 28, 28' and channels 29, 29', and welding simultaneously with the upper parts of the ridges 26, 26'. The reinforcement system 31, 31' is arranged on this wall 30, 30', and the whole is plunged into the bath again. The system of reinforcing ridges 32, 32' thereupon becomes formed and joins with the wall 30, 30'. The inlet and outlet orifices 33, 33' and 34, 34' for the heating and cooling fluid are pierced in the walls of the mould themselves and the metal with low melting point or the wax runs off, in a melted condition, through the said openings.

The mould as a whole is then reamed on all its surfaces and the half-moulds, after separation, can be fixed directly on the jaws of the press, in a known manner, by bolts or screws.

Figure 17:
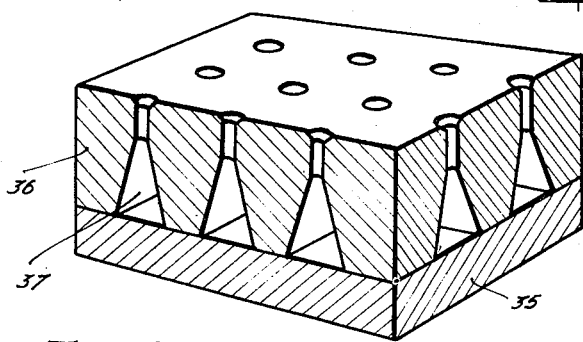
Fig. 17 is a diagrammatic perspective view of a portion of a piece or electroform covered by a plaster cast in which cavities have been made, constituting the negatives of the ridges.
Figure 18:
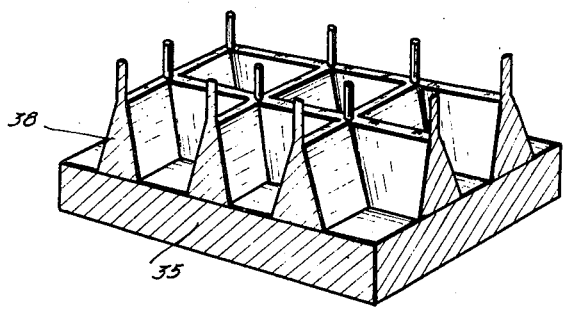
Fig. 18 is a diagrammatic perspective view of the unit of Fig. 17 as a whole after formation of the system of ridges obtained by casting metal with a low melting temperature.
Figure 12:
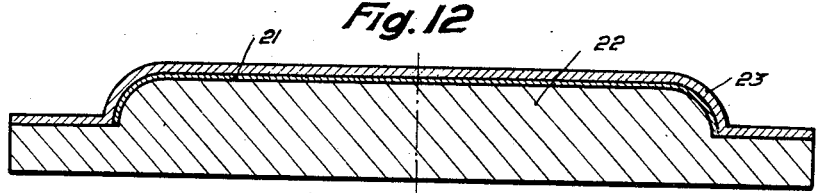
Fig. 12 is an axial cross-section of a pattern for a sheet metal automobile roof mounted on a flanged support, after a first deposit.
Figure 13:
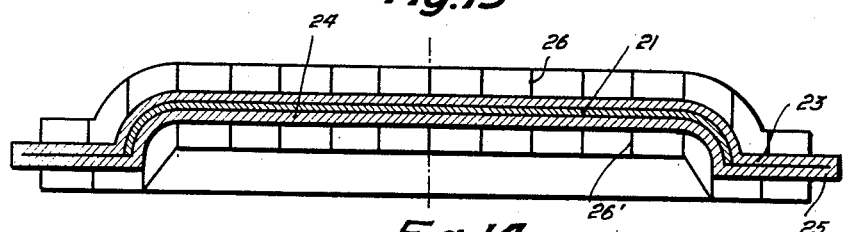
Fig. 13 is an axial cross-section of the roof pattern in Fig. 12, covered with an electrolytic deposit and a first system of strengthening supports on its two surfaces.
Figure 14:
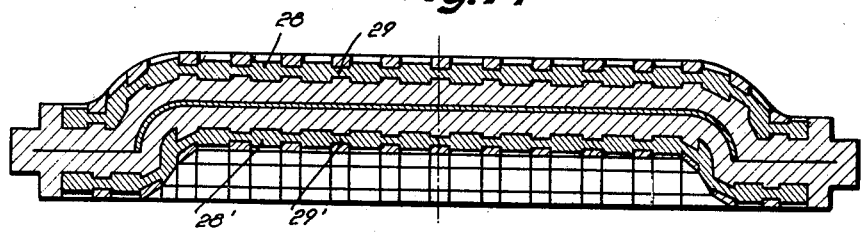
Fig. 14 is an axial cross-section of the mould shown in Fig. 13 after a second electrolytic deposit and formation of the cavities of the honey-comb thermic exchange chamber.
Figure 15:
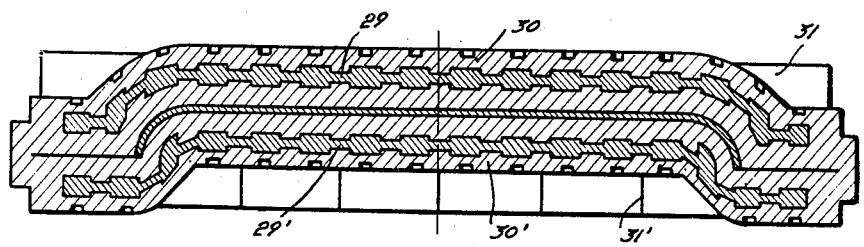
Fig. 15 is an axial cross-section of the mould shown in Fig. 14, after a further electrolytic deposit and mounting of a second system of reinforcements.
Figure 16:
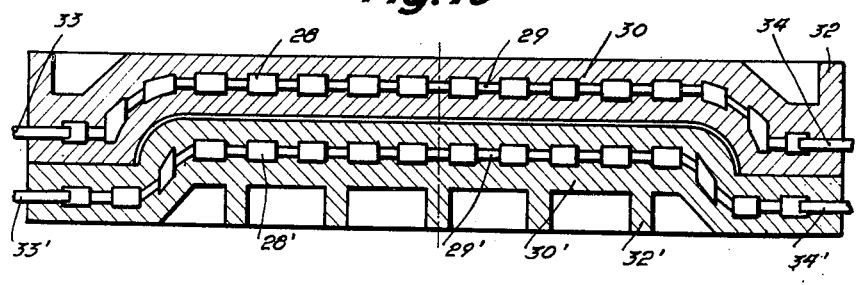
Fig. 16 is an axial cross-section of the finished unit of the mould shown in Figs. 12 to 15.

In the example shown in Figs. 17 and 18 the process covered by the invention is applied to the direct manufacture of an article such as an optical mirror, 2 m. in diameter, for instance, which must be extremely strong with a minimum weight and of which only a small portion is shown in the drawing. Moreover, the mirror must be provided with a fixing device.

An electrolytic deposit of given thickness is effected on a negative of the mirror. In view of the fact that such a mirror is normally subjected to thermal stresses only, which are small or even non-existent, the mirror shell can also be made of stamped sheet material.

In order to form the reinforcing ridges on the rear wall 35 of the mirror shell obtained by electroforming, or made of stamped sheet metal, a plaster cast 36 is first taken of the rear wall 35, the negatives 37 of the ridges 38 being hollowed directly in this cast. The cast 36 is again placed on the rear wall 35 of the mirror shell and the cavities 37 which are formed are filled with a metal having a low melting point. After removal of the plaster cast 36 the fixing device for the mirror, made separately, is mounted on the ridges 38 made of metal with a low melting point, and the whole is subjected to the action of the bath so as to obtain a deposit of the desired thickness. After the deposit has been completed, the reinforcing ridges are pierced and the low melting point metal flows off in the melted state.

Thanks to electroforming, not only are the ridges formed, joined to the mirror shell and the shell itself is reinforced, but further, the device for hanging or fixing the mirror is at the same time thoroughly joined to the apparatus as a whole, which avoids having to fix them by welding or brazing.

It goes without saying that the invention is in no way limited to the details of embodiment shown or described, which have merely been given by way of illustration, and that other forms may be adopted all coming within the scope of the claims which follow.

What is claimed is:

1. In a process for providing by electrodeposition a relatively thin walled metallic piece having a front face and a back face honeycomb design and likely to be subjected to static and thermal stresses with supporting ridges adapted to be electroplated, the steps comprising fixing said supporting ridges on to said back face of said metallic piece so as to form a current-conducting assembly and electroplating said supporting ridges as well as said back face of said metallic piece with a suitable metal thereby obtaining a metallic piece of honeycomb structure, provided on its back face with reinforcing electroplated supporting ridges surrounded on all sides by an homogeneous metallic mass and without its front face being in any way altered.

2. In a process as in claim 1 wherein said metallic piece is a thin-walled electroform.

3. In a process for providing by electrodeposition a relatively thin walled metallic electroform having a front face and a back face of honeycomb design and likely to be subjected to static and thermal stresses with supporting ridges having free end parts and adapted to be electroplated, the steps comprising fixing said supporting ridges on to said back face of said metallic electroform so as to form a current-conducting assembly and electroplating said supporting ridges as well as said back face of said metallic electroform with a suitable metal thereby obtaining a metallic electroform provided on its back face with reinforcing electroplated supporting ridges surrounded on all sides by an homogeneous metallic mass and without its front face being in any way altered, and electroplating said electroplated supporting ridges with a covering member joining together said free end parts thereby constituting a cavity subdivided by said electroplated supporting ridges in a honeycomb-like design and adapted to serve as a thermic exchange chamber.

4. In a process for providing by electrodeposition a relatively thin walled metallic electroform having a front face and a back face of any definite and accurate design and likely to be subjected to static and thermal stresses with supporting ridges having free end parts and adapted to be electroplated, the steps comprising fixing said supporting ridges on to said back face of said metallic electroform so as to form a current-conducting assembly and electroplating said supporting ridges as well as said back face of said metallic electroform with a suitable metal whereby obtaining a metallic electroform provided on its back face with reinforcing electroplated supporting ridges surrounded on all sides by an homogeneous metallic mass and without its front face being in any way altered, said reinforcing elements delimiting hollows between them, forming a hole in each of said supporting ridges, filling said hollows with a liquid material having a low melting point and presenting a free surface adapted to be electroplated with said metal, electroplating said reinforced electroform and said free surface of said material with said metal thereby obtaining an electroform having closed chambers filled with said material having a low melting point, piercing the wall of the mould into the closed chambers heating said electroform for melting said low melting material and having said material flowing off in a melted state thereby providing hollow chambers of honeycomb-like design adapted to serve as thermic exchange chambers.

5. In a process as in claim 4, further providing said electroform having said chambers with stiffening elements electroformed with said metal for taking or transmitting the greater part of the stresses applied to said electroform.

References Cited in the file of this patent

UNITED STATES PATENTS

| 901,115 | Metten | Oct. 13, 1908 |
| 997,768 | Feldkamp | July 11, 1911 |
| 1,014,603 | McPhayden et al | Jan. 9, 1912 |
| 1,930,826 | Scott et al | Oct. 17, 1933 |
| 2,004,102 | Dickey | June 11, 1935 |
| 2,113,223 | Salabes | Apr. 5, 1938 |
| 2,327,762 | Bull | Aug. 24, 1943 |
| 2,641,439 | Williams | June 9, 1953 |

FOREIGN PATENTS

| 860,940 | France | Oct. 15, 1940 |
| 118,797 | Australia | Aug. 24, 1944 |
| 486,639 | Canada | Sept. 16, 1952 |